United States Patent [19]

Trammell, Jr.

[11] 4,159,652
[45] Jul. 3, 1979

[54] BICYCLE DRIVE ASSEMBLY

[75] Inventor: Earl M. Trammell, Jr., St. Louis, Mo.

[73] Assignee: Cycle-Drive Corporation, St. Louis, Mo.

[21] Appl. No.: 802,130

[22] Filed: May 31, 1977

Related U.S. Application Data

[63] Continuation-in-part of Ser. No. 417,060, Nov. 19, 1973, Pat. No. 3,906,807.

[51] Int. Cl.² ............................................. F16H 29/04
[52] U.S. Cl. ...................................... 74/117; 280/259; 74/242.11 B; 74/217 B
[58] Field of Search ................... 74/242.11 B, 571 R, 74/571 M, 117, 217 B; 280/257, 259, 261

[56] References Cited

U.S. PATENT DOCUMENTS

| | | | |
|---|---|---|---|
| 3,908,474 | 9/1974 | Cole | 74/117 |
| 3,987,682 | 10/1976 | Roantree | 74/117 |

*Primary Examiner*—Samuel Scott
*Assistant Examiner*—Wesley S. Ratliff, Jr.
*Attorney, Agent, or Firm*—Cohn, Powell & Hind

[57] ABSTRACT

A drive assembly for a physically propelled vehicle such as a bicycle having a crank arm operatively connected to the drive member for rotating the drive member, and a power arm rotatively mounted on a power axis for relative angular movement between the power arm and crank arm. The drive axis, defined by the drive member, is relatively offset from the power axis. A control mechanism interconnects the power arm and crank arm for rotating the crank arm and drive member, and for accelerating the power arm ahead of the crank arm during one portion of the crank arm cycle and decelerating the power arm behind the crank arm during another portion of the crank arm cycle. A power-adjusting mechanism is connected to the power arm for moving the power axis relative to the drive axis for changing the point in the cycle of the crank arm when the acceleration and deceleration of the power arm occurs.

6 Claims, 9 Drawing Figures

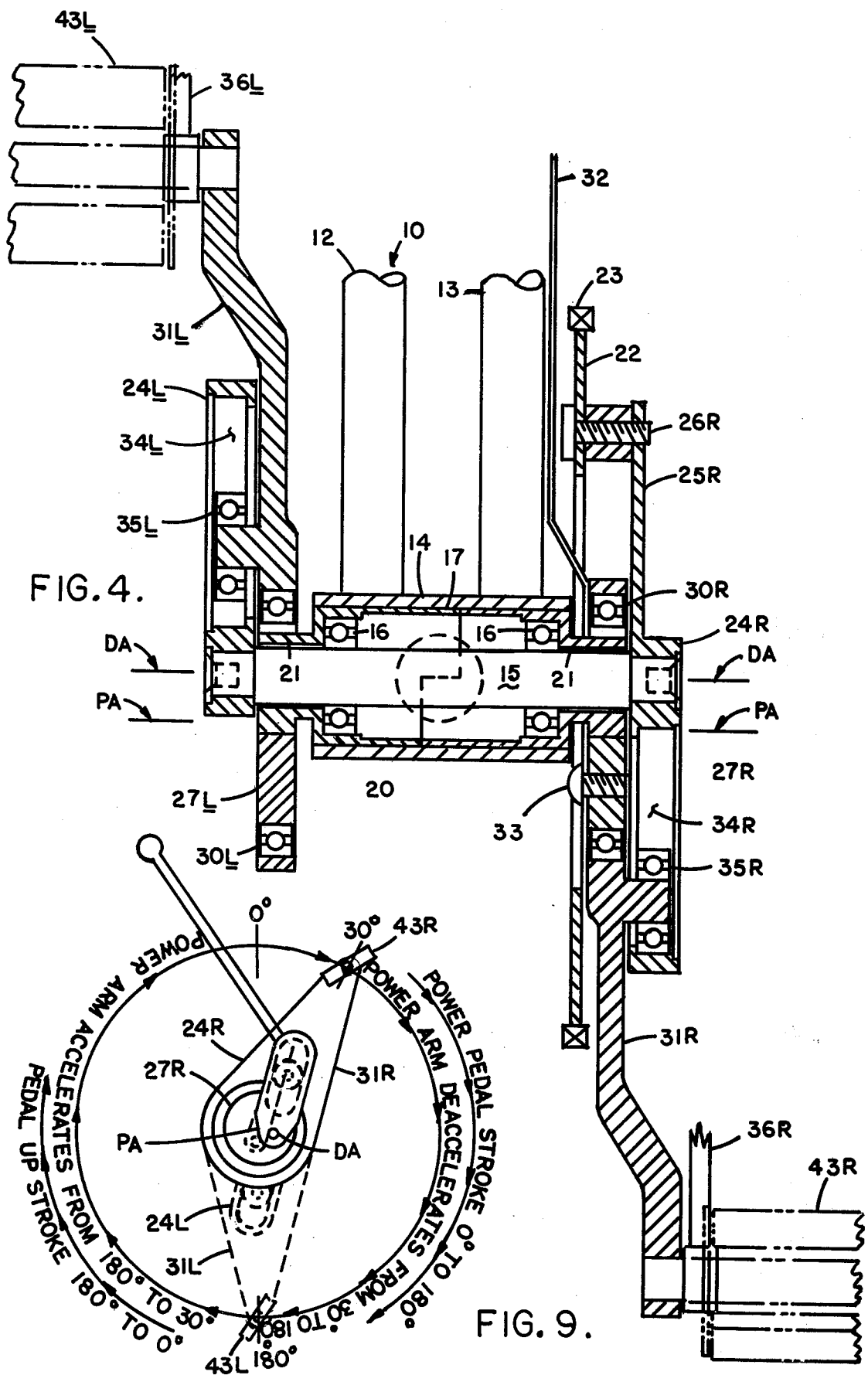

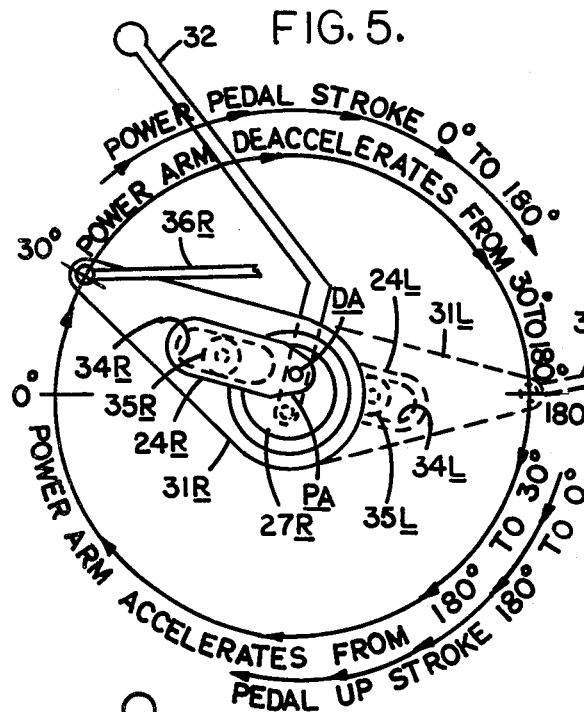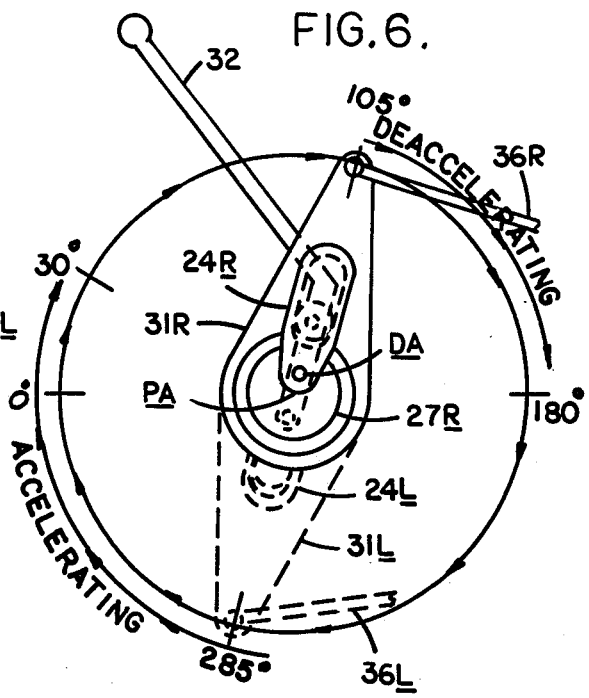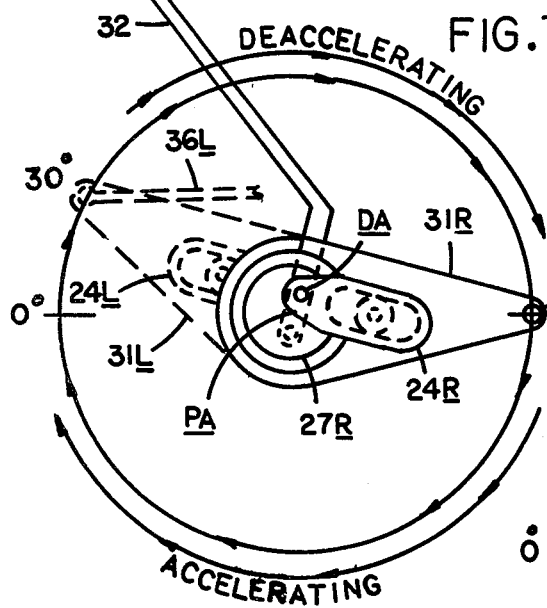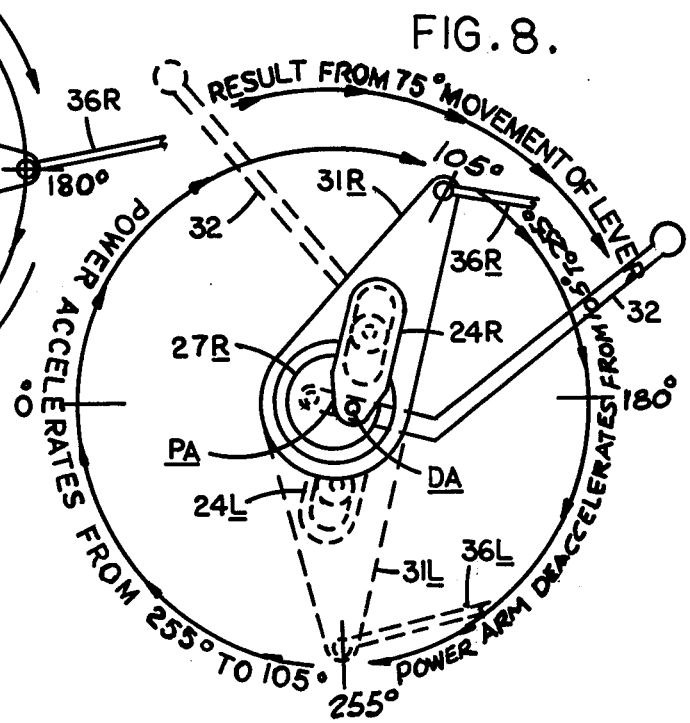

BICYCLE DRIVE ASSEMBLY

CROSS-REFERENCE TO RELATED APPLICATIONS

This application is a continuation-in-part of application Ser. No. 417,060, filed Nov. 19, 1973 and entitled "Bicycle Drive Assembly" and issued Sept. 23, 1975 as U.S. Pat. No. 3,906,807, prior U.S. Pat. No. 3,779,099 issued Dec. 18, 1973 which was co-pending with U.S. Pat. No. 3,906,807, and prior U.S. Pat. No. 4,029,334 issued June 14, 1977 which was co-pending with U.S. Pat. No. 3,779,099.

BACKGROUND OF THE INVENTION

This invention relates generally to improvements in a drive assembly for a physically propelled vehicle, and more particularly to an improved bicycle drive assembly.

A heretofore conventional bicycle drive assembly includes a crankshaft having a pedal which is connected to a sprocket, the pedal and crankshaft being turned directly with a rotary motion imparted by the rider. Propelling a bicycle with this conventional drive assembly has certain uncomfortable and inefficient aspects in that the rider must stand up on the pedals and assume a jack-knife position in order to obtain anything approaching effective pedaling power. This new drive assembly smoothly and efficiently controls the rate of pedal force. It further permits all pedaling to be done from a comfortable sitting position, and maximum pedal force to be easily and readily applied while seated. It is no longer necessary to stand up on the pedals in order to get sufficient pedaling power.

There have been some various types of drives developed for driving a bicycle with substantially reciprocating or oscillating pedaling action, but these prior drive assemblies have met with no success because they too are inefficient in their transfer of pedaling power through well-known linkage mechanisms.

SUMMARY OF THE INVENTION

The present drive assembly includes a more positive and efficient control over the pedal action, which in turn permits a more efficient rate of pedal travel to be established during the pedal power portion of the crank arm cycle.

The drive assembly performs smoothly and automatically under all phases of pedaling and requires no skill by the rider in order to obtain the improved performance.

The drive assembly provides control over the rate of pedal travel and self-propelled devices, and permits the rate of pedal travel to be calculated and adjusted to more efficiently respond to the pedal forces. Specifically, during dead top center and early degrees of crank arm travel, when conventional crank systems exert little gear-turning effort to the crank arm, the present drive assembly provides effective torque for doing so and further serves to establish an efficient rate of pedal speed throughout the pedal cycle.

The present drive assembly can be utilized to establish the same advantage for rotary pedal action as it does for reciprocating or oscillating pedal action. This is basically accomplished by transferring the foot pedal to the pivot point of the powder crank arm and the connector, which causes the pedal to travel in a rotary cycle. It can be seen that the rate of rotary pedal action achieves the same advantages during the top dead center and early degrees of crank arm travel as does the reciprocating or oscillating pedal. In fact, the rotary pedal rate of travel for the 360° crank arm cycle is relatively the same as accomplished by the reciprocating or oscillating pedal travel.

In the present drive assembly, a crank arm is operatively connected to a rotatively mounted drive member for rotating the drive member on a drive axis, and a power arm is rotatively mounted on a power axis for relative angular movement between the power arm and the crank arm. The drive axis and the power axis are relatively offset. A pedal means is operatively connected to the power arm for rotating the power arm. A control means interconnects the power arm and the crank arm for rotating the crank arm and the drive member, and for accelerating the power arm ahead of the crank arm during one portion of the crank arm cycle and decelerating the power arm behind the crank arm during another portion of the crank arm cycle. A power-adjusting means is connected to the power arm for moving the power axis relative to the drive axis for changing the point in the cycle of the crank arm when the acceleration and deceleration of the power arm occurs.

The control means includes a cam surface provided on either the power arm or crank arm, and a cam follower carried by another of the arms and engaging the cam surface.

The power-adjusting means includes means for rotating the power axis about the drive axis.

More particularly, the power-adjusting means includes an eccentric rotatively mounted on the drive axis, the power arm being rotatively mounted on the eccentric, and the eccentric defining the power axis. The eccentric is selectively rotated to turn the power axis about the drive axis.

A crankshaft defining the drive axis is drivingly connected to the crank arm. The power-adjusting means includes a sleeve rotatively mounted on the crankshaft, and an eccentric drivingly connected to the sleeve. The power arm is rotatively mounted on the eccentric, the eccentric defining the power axis. The eccentric is then selectively rotated to turn the power axis about the drive axis.

The power-adjusting means permits easy manual control to be used during operation of the bicycle to vary the position that maximum angular distance occurs between the crank arm and power arm during the crank cycle. This permits the rider to select where the greater range of acceleration of the power arm occurs, i.e., during the pedal power stroke or during the pedal up stroke. When the greater acceleration of the power arm takes place during the pedal power stroke, then a lower "gearing ratio" is accomplished; when during the pedal up stroke, than a higher "gearing ratio" is accomplished. The rider is able to manually vary the "gearing" of a bicycle with this new system the same as a rider presently does with a common derailer system. Actually, the power adjusting means which operates in conjunction with this new drive system has not been designed to replace the derailer system or such, but can be used directly with it in order to provide a greater "gearing range" and improved performance.

BRIEF DESCRIPTION OF THE DRAWING

FIG. 4 is a cross-sectional view of the drive assembly of FIG. 3;

FIGS. 5-7 are diagrams illustrating the positions of the component parts of the drive assembly at various stages of the crank arm cycle;

FIG. 8 is a diagram illustrating the drive assembly upon selective adjustment of the relative positions of the power and drive axes, and FIG. 9 is a diagram illustrating the drive assembly of FIGS. 1-7 with rotary pedal action.

DESCRIPTION OF THE PREFERRED EMBODIMENTS

Figure 3:
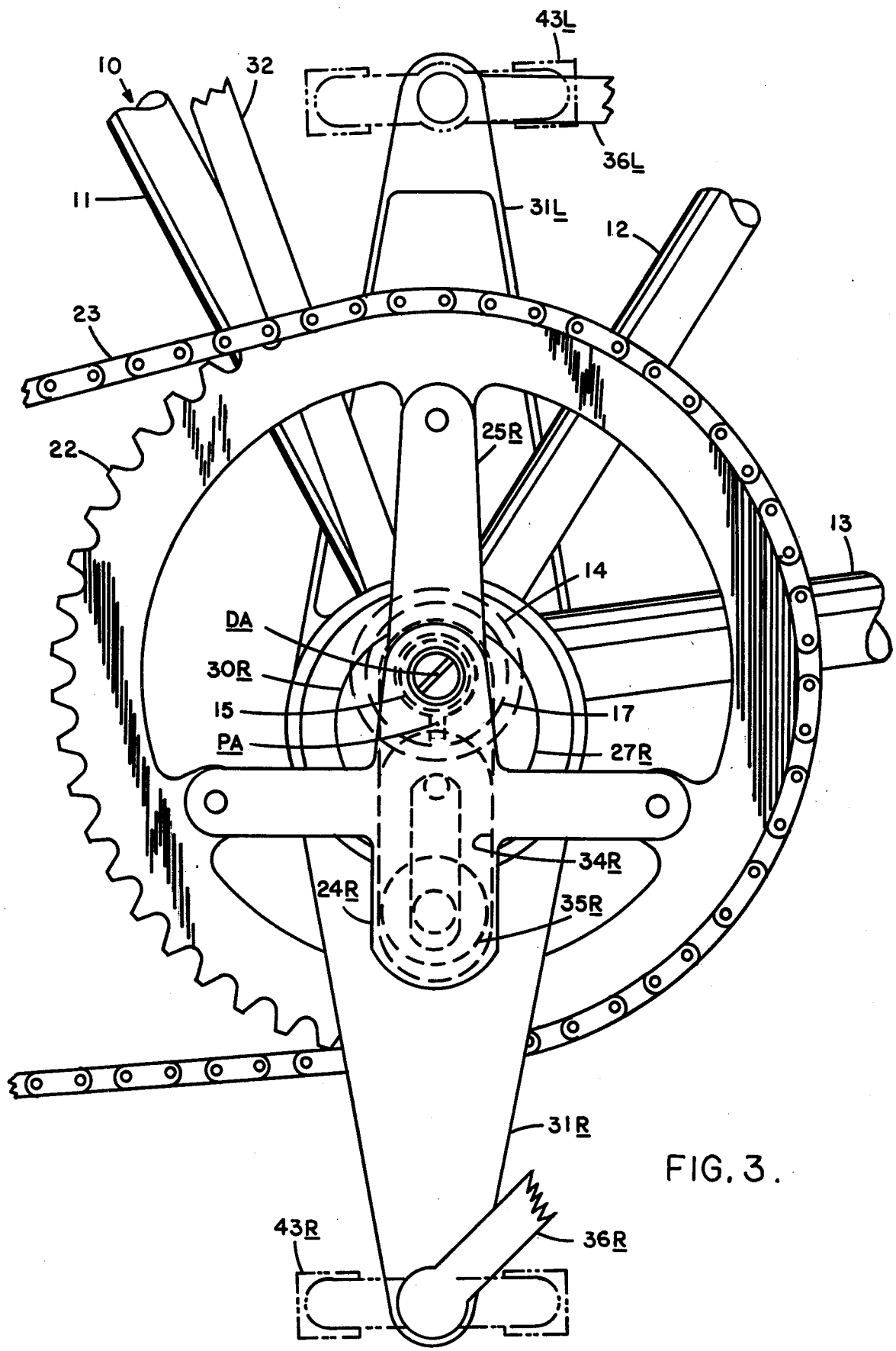
FIG. 3 is a fragmentary, side elevational view of a bicycle incorporating the improved drive assembly.

Referring now by characters of reference to the drawings, and first to FIGS. 3 and 4, it is seen that the bicycle includes a frame generally indicated by 10 having frame portions 11, 12 and 13 interconnected by a bracket 14.

As is best shown in FIG. 4, a crankshaft 15 is rotatively mounted within the bracket 14, and extends laterally from each side of the bracket 14. Rotatively mounted on the crankshaft 15 by a pair of axially spaced bearings 16 and located within the bracket 14, is a sleeve 17. The sleeve 17 is constructed of two parts with mating and interengaging stepped internal margins 20 to facilitate assembly of the sleeve 17 into the bracket 14 and to provide a rotary drive connection therebetween. The crankshaft 15 defines a drive axis DA. The sleeve 17 extends outwardly from each side of the bracket 14 to provide a reduced sleeve neck 21.

A sprocket 22, constituting a drive member, is located on the right hand side of the frame 10. As is conventional, the sprocket 22 is connected to the drive wheel (not shown) of the bicycle by an endless chain 23.

It will be understood that the mechanism of the drive assembly actuated by the rider's right foot is the same as the mechanism provided for the rider's left foot except that the component parts are appropriately arranged so that when the rider's one foot is substantially in its uppermost position, the other foot is substantially in or near its lowermost position. Consequently, a detailed description of the mechanism for the rider's right foot will suffice for the mechanism for the left foot, and the corresponding parts will be identical reference numbers except that the mechanism for the rider's right foot will bear the suffix R and the mechanism for the rider's left foot will bear the suffix L.

A crank arm 24R is fixedly attached to the end of the crankshaft 15 and rotates about the same drive axis DA as the sprocket 22. The crank arm 24R includes three extending arm portions 25R that are attached by fasteners 26R to the sprocket 22.

A power-adjusting means includes an eccentric 27R fixed to the sleeve neck 21. The eccentric 27R defines a power axis PA that is offset from the drive axis DA.

Rotatively mounted by bearing 30R on the eccentric 27R, is a power arm 31R. A shift rod 32 is fixed by fastener 33 to the eccentric 27R. Because the eccentrics 27R and 27L are operatively interconnected by the sleeve 17, rotational adjustment of the eccentric 27R by shift rod 32 will cause a simultaneous and identical adjustment of the other eccentric 27L.

A control means interconnects the crank arm 24R and the power arm 31R for rotating the crank arm 24R and the sprocket 22, and for accelerating the power arm 31R ahead of the crank arm 24R during one portion of the crank arm cycle and decelerating the power arm 31R behind the crank arm 24R during another portion of the crank arm cycle. This control means includes a cam surface 34R formed by a slot provided on the crank arm 24R. The control means further includes a cam follower 35R, consisting of a roller mounted on a shaft, fixed to the power arm 31R. The cam follower 35R engages the cam surface 34R.

Figure 1:
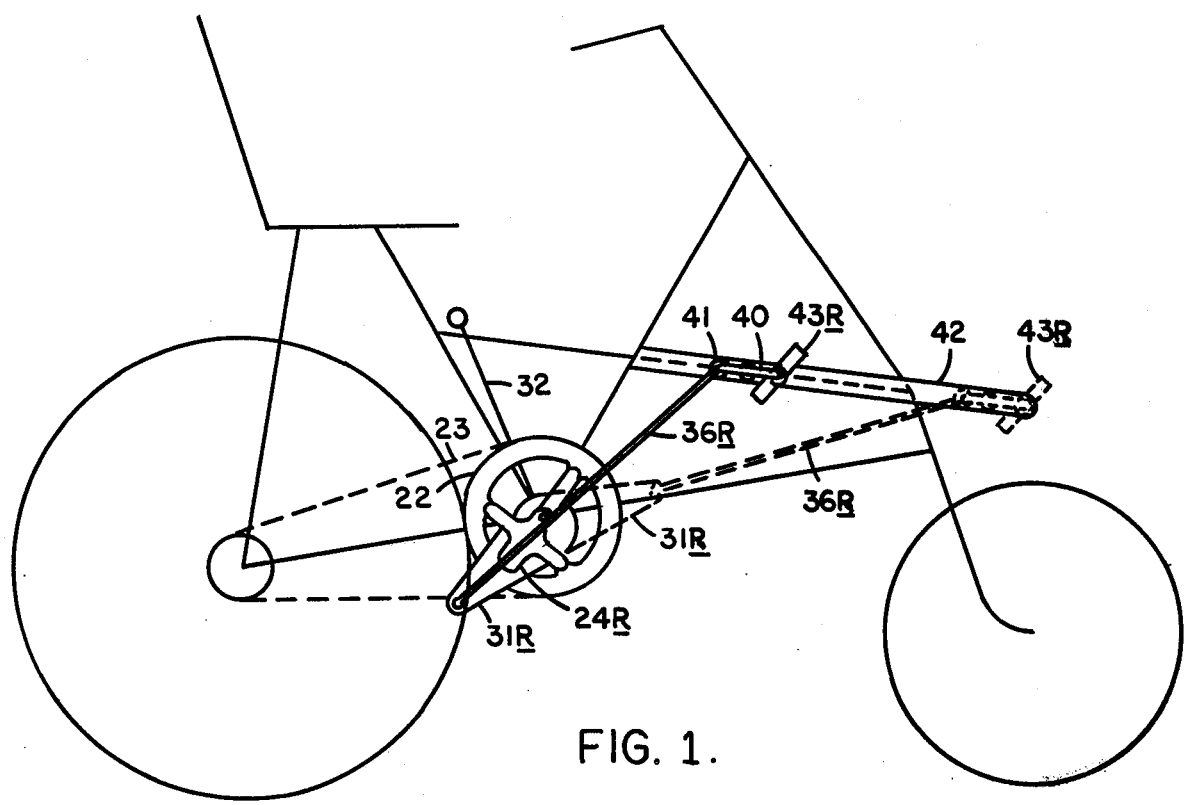
FIG. 1 is a side elevational schematic drawing of a bicycle using one embodiment of the drive assembly.

In one embodiment, the pedal means includes an elongate connector 36R pivotally connected to the outer end of the power arm 31R. Carried on the other end of the connector 36R is a pedal 43R (FIG. 1) adapted to receive the rider's right foot for actuating the connector 36R. More particularly, the pedal 43R is carried by a bracket 40 having a pair of bearing rollers 41 movable reciprocally in a track 42 mounted on the bicycle frame 10.

The operation of the drive assembly is perhaps best shown by the diagramatic illustrations of FIGS. 5-7. The first diagram of FIG. 5 shows the arrangement of the component parts of the drive assembly when the power arm 31R is 30° past dead top center position. In this position, the crank arm 24R is located relatively 15° behind the power arm 31R. It will be understood that the crank arm 24R and 24L are maintained at opposed 180° relationship at all times.

As the pedal 43R (FIG. 1) is pushed forwardly by the rider, the connector 36R rotates the power arm 31R from the position shown in FIG. 5 to the position shown in FIG. 6, i.e., to approximately 105° past dead top center. As this action takes place, the cam follower 35R rotates the crank arm 24R. During this power arm 31R and crank arm 24R rotation, the cam follower 35R engages the cam surface 34R to effectively decelerate the relative movement of the power arm 31R, and brings the power arm 31R and the crank arm 24R into substantial alignment at the 105° position illustrated in FIG. 6.

It will also be understood that the other power arm 31L and its associated crank arm 24L are brought into substantial alignment at approximately 180° opposed to the 105° position attained by the power arm 31R and crank arm 24R.

Upon continued forward movement of the pedal 43R, the connector 36R will further rotate the power arm 31R and crank arm 24R to the position illustrated in FIG. 7. In this position, the power arm 31R is located at substantially bottom dead center, i.e., 180°, while the associated crank arm 24R has moved relatively forwardly of the power arm 31R. During this movement, the cam follower 35R has relatively decelerated the power arm 31R behind the crank arm 24R.

It will be importantly noted that when the power arm 31R is located in its bottom dead center position as illustrated in FIG. 7, the other power arm 31L is located 30° past dead top center, and its associated crank arm 24L is located 150° behind the power arm 31L, so that when force is then applied to the connector 36L through its associated pedal 43L, effective turning force is applied to the power arm 31L and thence to the crank arm 24L. It will be understood that a dead top center position of the power arm 31L and crank arm 24L is avoided when the power arm 31R is located in its bottom dead center position.

Now, the pedal connector 36L applies a rotative force to the power arm 31L upon the rider applying a pushing force to its associated connector pedal 43L. Consequently, a rotative force is applied to the crank arm 24L through the cam follower 35L. When the power arm 31L and crank arm 24L are moved from the positions shown in FIG. 5 to the positions shown in FIG. 6, they are aligned at approximately 105° past dead top center. The cam follower 35L has relatively decelerated the movement of the power arm 31L. Conversely, the cam follower 35R has now relatively accelerated the movement of the power arm 31R to bring it into alignment with its associated crank arm 24R.

Upon still further return movement of the pedal connector 36R, the cam follower 35R will relatively accelerate the power arm 31H ahead of the crank arm until the power arm 31R and crank arm 24R are located again in the positions illustrated in FIG. 5, thereby providing a complete cycle of operation.

At any time during the cycle of operation, the rider can selectively rotate the eccentrics 27R and 27L by movement of the shift rod 32, which has the effect of turning the power axis about the drive axis. This adjustment changes the point in the cycle of the crank arms 24R and 24L when acceleration and deceleration of the power arms 31R and 31L occurs. For example, as illustrated in FIG. 8, the shift lever 32 and hence the eccentric 27R has been moved 75° in a clockwise direction. The result of this adjustment is that the power arm 31R decelerates from 105° to 255° and accelerates from 255° to 105°. In essence, the rider has effectively changed the so-called "gearing" of the drive assembly. To compare the change, it will be understood that in FIG. 5, there is a deceleration of 150° during the power arm stroke (from 30° to 180°), while in FIG. 8, there is a deceleration of 75° during the power arm stroke. This has the effect of a lower "gear ratio" in the drive assembly.

Figure 2:
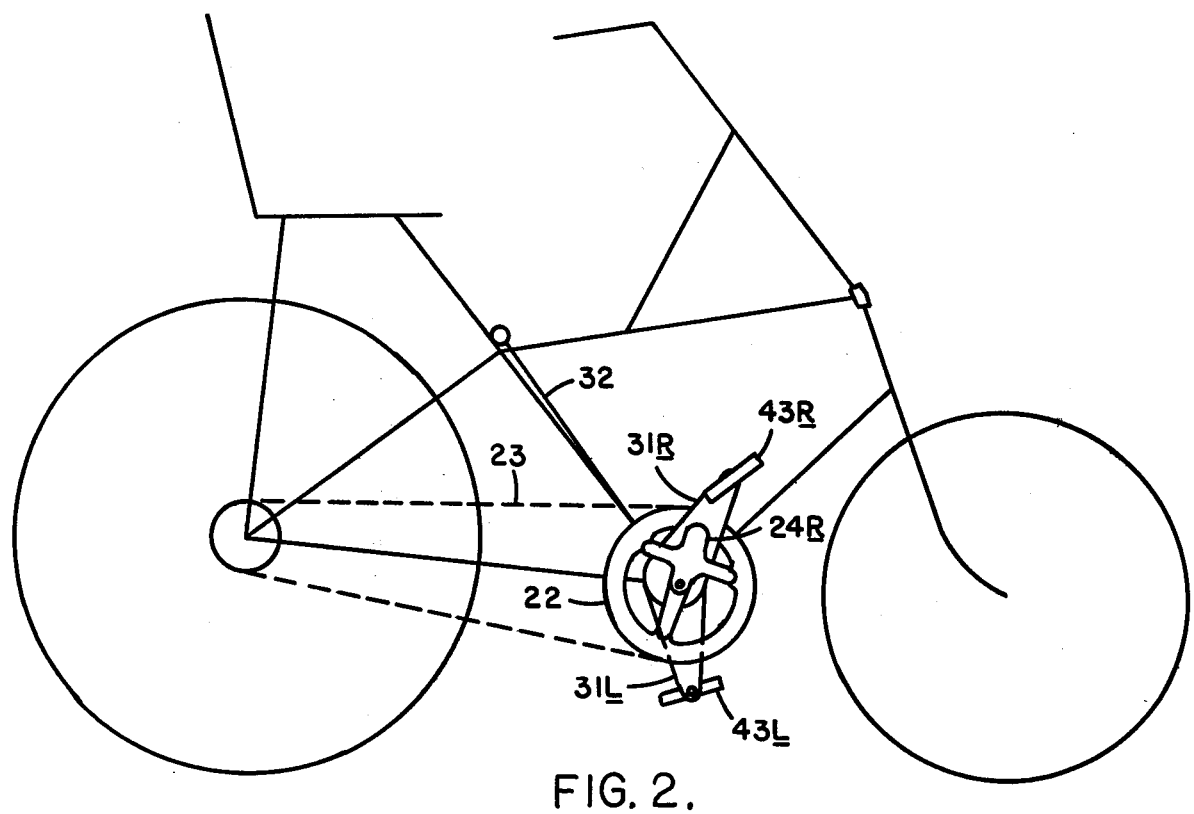
FIG. 2 is a side elevational schematic drawing of a bicycle using another embodiment of the drive assembly.

It will also be understood that the drive assembly described above in FIGS. 1 and 3–8 can be utilized to accomplish the same advantages for rotary pedal action as it does for reciprocating or oscillating pedal action, and is shown in a bicycle schematically in FIG. 2. This is accomplished basically by shifting the component parts of the drive assembly around until the top dead center position of the crank arm is located substantially at the top of the cycle, and transferring the pedals 43R and 43L to a connection directly with the ends of the respective power arms 31R and 31L. This is indicated diagramatically in FIG. 9. It will be understood that the rate of rotary pedal action obtains the same advantages during top dead center and the early degrees of crank arm travel as does the reciprocating or oscillating acting pedal. In fact, the rotary pedal rate of travel for the 360° cycle is relatively the same as accomplished by the reciprocating or oscillating pedal travel. The rotative adjustment of the eccentrics 27R and 27L and the resultant advantages are the same.

I claim as my invention:

1. A drive assembly for a physically propelled vehicle, comprising:
   (a) a drive member rotatively mounted on a drive axis,
   (b) a crank arm operatively connected to the drive member for rotating the drive member,
   (c) a power arm rotatively mounted on a power axis for relative angular movement between the power arm and crank arm, the drive axis and power axis being relatively offset,
   (d) a pedal means operatively connected to the power arm for rotating the power arm,
   (e) control means interconnecting the power arm and crank arm for rotating the crank arm and drive member, and for accelerating the power arm ahead of the crank arm during one portion of the crank arm cycle and decelerating the power arm behind the crank arm during another portion of the crank arm cycle, and
   (f) power-adjusting means connected to the power arm for moving the power axis relative to the drive axis for changing the point in the cycle of the crank arm when the acceleration and deceleration of the power arm occurs.

2. A drive assembly as defined in claim 1, in which:
   (g) the control means includes:
      (1) a cam surface provided on one of the arms, and
      (2) a cam follower carried by the other of the arms and engaging the cam surface.

3. A drive assembly for a physically propelled vehicle, comprising:
   (a) a drive member rotatively mounted on a drive axis,
   (b) a crank arm operatively connected to the drive member for rotating the drive member,
   (c) a power arm rotatively mounted on a power axis for relative angular movement between the power arm and crank arm, the drive axis and power axis being relatively offset,
   (d) a pedal means operatively connected to the power arm for rotating the power arm,
   (e) control means interconnecting the power arm and crank arm for rotating the crank arm and drive member, and for accelerating the power arm ahead of the crank arm during one portion of the crank arm cycle and decelerating the power arm behind the crank arm during another portion of the crank arm cycle,
   (f) power-adjusting means connected to the power arm for moving the power axis relative to the drive axis for changing the point in the cycle of the crank arm when the acceleration and deceleration of the power arm occurs,
   (g) the power-adjusting means including means for rotating the power axis about the drive axis.

4. A drive assembly as defined in claim 1, in which:
   (g) the power-adjusting means includes an eccentric rotatively mounted on the drive axis, the eccentric defining the power axis, and the eccentric being selectively rotated on the drive axis to turn the power axis about the drive axis, and
   (h) the power arm is rotatively mounted on the eccentric.

5. A drive assembly for a physically propelled vehicle, comprising:
   (a) a drive member rotatively mounted on a drive axis,
   (b) a crank arm operatively connected to the drive member for rotating the drive member,
   (c) a power arm rotatively mounted on a power axis for relative angular movement between the power arm and crank arm, the drive axis and power axis being relatively offset,
   (d) a pedal means operatively connected to the power arm for rotating the power arm,
   (e) control means interconnecting the power arm and crank arm for rotating the crank arm and drive member, and for accelerating the power arm ahead of the crank arm during one portion of the crank arm cycle and decelerating the power arm behind the crank arm during another portion of the crank arm cycle, (f) power-adjusting means connected to the power arm for moving the power axis relative to the drive axis for changing the point in the cycle of the crank arm when the acceleration and deceleration of the power arm occurs, (g) a crankshaft drivingly connected to the crank arm, the crankshaft defining the drive axis, (h) the power-adjusting means including:
  (1) a sleeve rotatively mounted on the crankshaft, and
  (2) an eccentric drivingly connected to the sleeve, the eccentric defining the power axis, and the eccentric being selectively rotated about the drive axis to turn the power axis about the drive axis, and (i) the power arm is rotatively mounted on the eccentric.

6. A drive assembly for a physically propelled vehicle, comprising:

(a) a drive member rotatively mounted on a drive axis, (b) a crank arm operatively connected to the drive member for rotating the drive member, (c) a power arm rotatively mounted on a power axis for relative angular movement between the power arm and crank arm, the drive axis and power axis being relatively offset, (d) a pedal means operatively connected to the power arm for rotating the power arm, and (e) control means interconnecting the power arm and crank arm for rotating the crank arm and drive member, and for accelerating the power arm in one direction relative to the crank arm during one portion of the crank arm cycle and decelerating the power arm in the opposite direction relative to the crank arm during another portion of the crank arm cycle, the control means including:
  (1) a cam surface provided on one of the arms, and
  (2) a cam follower carried by the other of the arms and engaging the cam surface.

* * * * *